US012612122B2

(12) United States Patent
Ehirim

(10) Patent No.: US 12,612,122 B2
(45) Date of Patent: Apr. 28, 2026

(54) ROLLING DIFFUSER RAMP FOR MOTOR VEHICLE

(71) Applicant: Obinna Hyacinth Ehirim, Toronto (CA)

(72) Inventor: Obinna Hyacinth Ehirim, Toronto (CA)

(73) Assignee: OBINNA HYACINTH EHIRIM, Toronto (CA)

( * ) Notice: Subject to any disclaimer, the term of this patent is extended or adjusted under 35 U.S.C. 154(b) by 340 days.

(21) Appl. No.: 18/501,058

(22) Filed: Nov. 3, 2023

(65) Prior Publication Data

US 2025/0145229 A1     May 8, 2025

(51) Int. Cl.
B62D 37/02 (2006.01)
B62D 35/02 (2006.01)

(52) U.S. Cl.
CPC ............. B62D 37/02 (2013.01); B62D 35/02 (2013.01)

(58) Field of Classification Search
CPC ........ B62D 35/00; B62D 35/02; B62D 35/04; B62D 35/007; B62D 37/00; B62D 37/04
USPC ...................................................... 296/180.1
See application file for complete search history.

(56) References Cited

U.S. PATENT DOCUMENTS

| | | | | |
|---|---|---|---|---|
| 4,455,045 A | * | 6/1984 | Wheeler | ................ B62D 35/00 |
| | | | | 296/180.1 |
| 8,210,600 B1 | * | 7/2012 | Verhee | ................. B62D 35/005 |
| | | | | 296/180.1 |
| 8,366,178 B2 | * | 2/2013 | Yamagishi | ............. B62D 35/02 |
| | | | | 296/180.1 |
| 9,957,000 B1 | * | 5/2018 | Ehirim | ................. B62D 35/007 |
| 10,279,677 B2 | * | 5/2019 | Nitsche | ................. B60K 11/08 |
| 11,390,335 B2 | * | 7/2022 | Thomas | ............... B62D 35/007 |
| 11,447,192 B2 | * | 9/2022 | Moradnia | .............. B62D 35/02 |
| 11,891,126 B2 | * | 2/2024 | Moradnia | ............ B62D 35/007 |

FOREIGN PATENT DOCUMENTS

| | | | | | |
|---|---|---|---|---|---|
| CN | 103707946 A | * | 4/2014 | ............. | B62D 35/02 |
| DE | 102017128791 A1 | * | 6/2019 | ............. | B62D 37/02 |

OTHER PUBLICATIONS

CN103707946 Text (Year: 2014).*
DE102017128791 Text (Year: 2019).*

* cited by examiner

*Primary Examiner* — Amy R Weisberg

(57) ABSTRACT

Aerodynamic downforce is generated by an automobile diffuser located on the aft section of a motor vehicle's underbody. The upsweeping inclination of the diffuser ramp wall enables the expansion of airflow traveling through the diffuser to induce suction underneath the motor vehicle—thereby enhancing traction between the tires and road surface. However, moving (or rolling) the diffuser ramp wall in the airflow direction further increases suction and airflow speed underneath the vehicle and through the diffuser. As a result, downforce in-turn is enhanced.

8 Claims, 2 Drawing Sheets

4 2      1       3

$Vy = V \sin \theta$ $$V\,(ramp) = \sqrt{(V \sin \theta)^2 + (V \cos \theta)^2}$$

$V\,(ramp)$ $\theta$ $Vx = V \cos \theta$

ROLLING DIFFUSER RAMP FOR MOTOR VEHICLE

SCOPE OF INVENTION

The invention presented concerns the subject of motor vehicles, and particularly, to a rolling diffuser ramp for motor vehicle.

BACKGROUND OF INVENTION

Aerodynamics plays a critical role in the performance of road and racing cars. The quantifying measure of the aerodynamic efficiency of a motor vehicle is its aerodynamic downforce or lift divided by its aerodynamic drag. In road cars, low drag can be generated by streamlining its shape. This enables the car cut through surrounding air with less air resistance leading to a reduced amount of energy required to move the vehicle. Furthermore, it results in a reduction in fuel consumption and greenhouse gas emissions for gas/petrol-powered cars. For electric vehicles, it extends the mile range on a single battery charge which allows for a reduction in battery weight.

In racing and sports vehicles, aerodynamic downforce is of prime importance in enabling the vehicle travel quicker through the corners of a race track by enhancing traction and stability. Aerodynamic devices such as a diffuser, front splitter and an inverted front wing positioned in near proximity to the road surface and an inverted rear wing mounted high above the vehicle's rear section are generally used to generate downforce. The front splitter, lower surfaces of wings and diffuser largely produce downforce by generating underbody low pressures due to the acceleration of airflow underneath, with the upper surfaces of the wings generating high pressures.

The diffuser is applicable to both road and racing cars because when combined with a smooth vehicle underfloor, it accelerates uninhibited airflow traveling between the smooth underfloor and the road surface thereby enhancing downforce. Likewise on road cars, the airflow travelling underneath a smooth vehicle underfloor is uninterrupted and the upward expansion of the airflow through a diffuser exit reduces vehicle near-wake size, thus reducing drag.

Flow control mechanisms that further enhance the downforce generated by the diffuser can be implemented as passive or active systems. Passive systems that alter the pressure distribution on the diffuser ramp by delaying pressure recovery are largely geometrical alterations of the diffuser design (as in Ehirim, O.H., U.S. Pat. No. 9,957,000B1, 2018). The rolling diffuser ramp for motor vehicle as presented is an active system due to the rolling or moving action of the diffuser ramp. Therefore, it is designed to further enhance the downforce-inducing effect of the diffuser with minimal drag penalty, and also actively employed to shift the aerodynamic balance of the vehicle rearwards.

SUMMARY OF INVENTION

As a means of supplementing the downforce produced by a motor vehicle underbody diffuser-floor, the invention as described is a rolling diffuser ramp for motor vehicle which consists of a motor vehicle diffuser with a moving or rolling diffuser ramp surface. The central rolling ramp surface which moves in the same direction as the airflow through the diffuser is about 70%-80% in area size of the entire diffuser ramp and is mounted as a conveyor belt on two pulleys driven by an electric motor.

The motor vehicle diffuser is an aerodynamic device which is sensitive to its distance (or ride height) from the ground surface. The diffuser induces a venturi effect with the inlet constricting the underbody airflow into the diffuser and the diverging cross section expanding the airflow into a larger exit area. Thus, pressure drops at the inlet and gradually recovers towards the exit as airflow is re-introduced into the higher ambient pressure. As a result, when the motor vehicle diffuser ride height is lowered from high to low, downforce gradually increases until peak downforce is reached. Further lowering of the ride height beyond that of peak downforce leads to a sharp drop in downforce, with continuing ride height reduction resulting in low downforce production.

The initial reduction from a high ride height (of about 100 mm) induces a downforce enhancement flow regime characterized by a suction-inducing counter-rotating vortex pair along both longitudinal sides of the diffuser ramp. These vortices originate at the spanwise ends of the diffuser inlet or kick point and extend along the longitudinal sides of the diffuser. They are generated as a result of airflow traveling from a region of high pressure outside the diffuser to a region of low pressure within the diffuser. The vortices increase in size and in suction-inducing effect with further ride height reduction as typified in the maximum (peak) downforce flow regime. With subsequent ride height decrease into the accompanying force reduction flow regime, vortex breakdown occurs to one of the counter-rotating vortex pair and induces flow recirculation and separation which in-turn leads to an abrupt downforce loss. Further ride height reduction beyond the downforce reduction flow regime (or low ride height of about 15 mm or less) leads to the low downforce flow regime which is largely dominated by slow-moving boundary layer flow which induces flow blockage through the diffuser.

The moving action of the rolling diffuser ramp surface incorporated into a motor vehicle diffuser augments the downforce the diffuser produces from high to low ride heights by accelerating flow from the diffuser inlet to its exit. As a consequence, suction generated across the diffuser ramp is enhanced and extended rearwards from the peak suction at the diffuser inlet to the pressure recovery at the diffuser exit. The action of the rolling diffuser ramp does not change the flow physics characterized in the distinct four flow regimes from high to low ride heights. However, it enhances the vortex strength (vorticity) of the longitudinal counter-rotating vortex pair and mitigates the slow-moving boundary layer flow along the ramp surface.

The additional downforce produced by the rolling diffuser ramp surface as deduced from extensive computational simulations indicate up to 7%-10% average increase relative to the diffuser in stationary mode across the range of high to low ride heights with about a 1% average drag increase relatively. The downforce increases are lower when the rolling speed of the ramp is lower than the freestream airflow (or speed of vehicle). However, the downforce increments increases when ramp rolling speed is the same as freestream airflow with subsequent increases when ramp rolling speed is higher than freestream. There is also a nominal downforce amount generated when the motor vehicle is stationary with the rolling ramp speed at above 15 m/s. These performance attributes make the invention particularly suited for deployment in slow to medium speed corners where high downforce and rear stability at relatively slower speeds is beneficial in reducing lap times. It is of note to state that the overall efficiency of the rolling diffuser ramp invention depends on the amount of downforce added by the system for the penalty of the electrical energy expended and added weight of the system.

DETAILED DESCRIPTION OF EMBODIED COMPONENTS

The rolling diffuser ramp for motor vehicle invention is delineated to a greater extent with regards to its specific components. Furthermore, it is imperative to state that the delineations are not designed to limit the scope of the invention, but only to limn the invention in detail.

Figure 1:
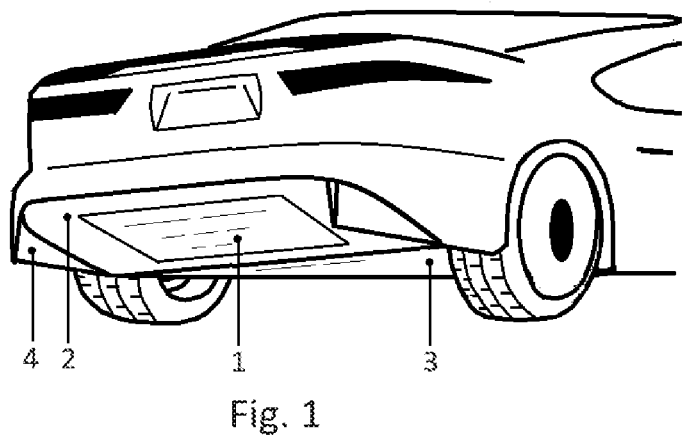
FIG. 1 is an isometric view of the rear and underside of the motor vehicle highlighting the motor vehicle diffuser with the rolling diffuser ramp surface.

In FIG. 1, the rolling diffuser ramp surface 1 made of smooth synthetic rubber or stainless steel is located at the central area of the upwardly inclined diffuser ramp 2. When airflow travels underneath the upstream vehicle floor 3 into the diffuser area, the activation of the rolling ramp further accelerates the airflow across the length of the diffuser. This enhances suction and strengthens a longitudinal vortex pair along the length of the diffuser endplate 4 on both sides of the diffuser. The rolling diffuser ramp has thickness of about 1 mm to 2 mm, is rectangular in shape and is centrally positioned forms 70% to 80% of the overall rolling diffuser ramp. The rolling diffuser ramp hangs above the stationary portion of the rolling diffuser ramp within a 5 mm clearance.

Figure 2:
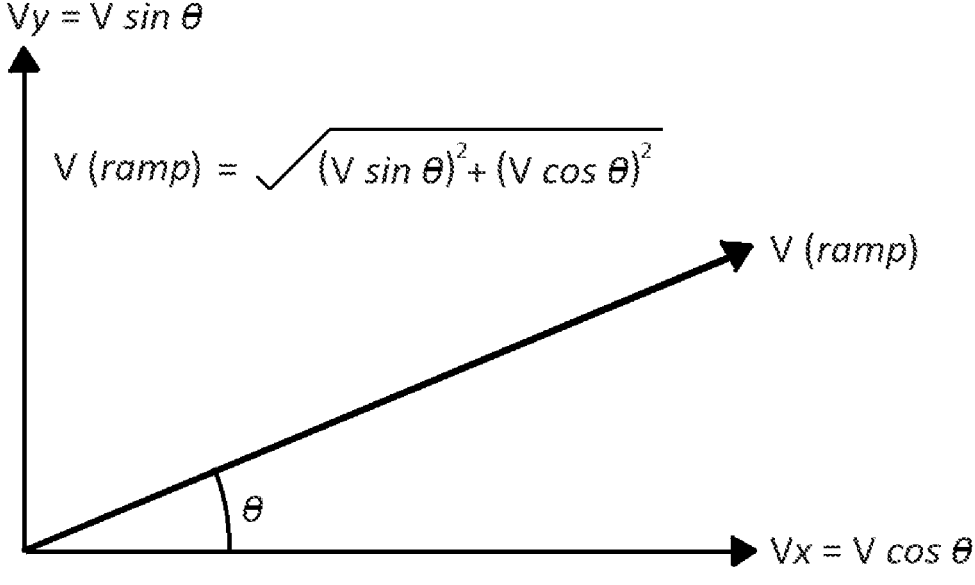
FIG. 2 illustrates the resultant velocity of the rolling diffuser ramp (V ramp) as a sum of its horizontal (Vx-axis) and vertical (Vy-axis) component velocities for a given diffuser ramp angle θ.

As illustrated in FIG. 2, the resultant speed of the rolling ramp in the diagonal direction for a specific diffuser ramp angle θ is determined by the vector sum of the horizontal and vertical velocity components along the x- and y-axes respectively. The diffuser aerodynamic performance is sensitive to the ramp angle. Increasing the diffuser angle from low to high (single to double digits), increases the expansion of the airflow through the diffuser. However, at severely high angles the diffuser aerodynamic performance drops due to flow separation from the diffuser ramp.

Figure 3:
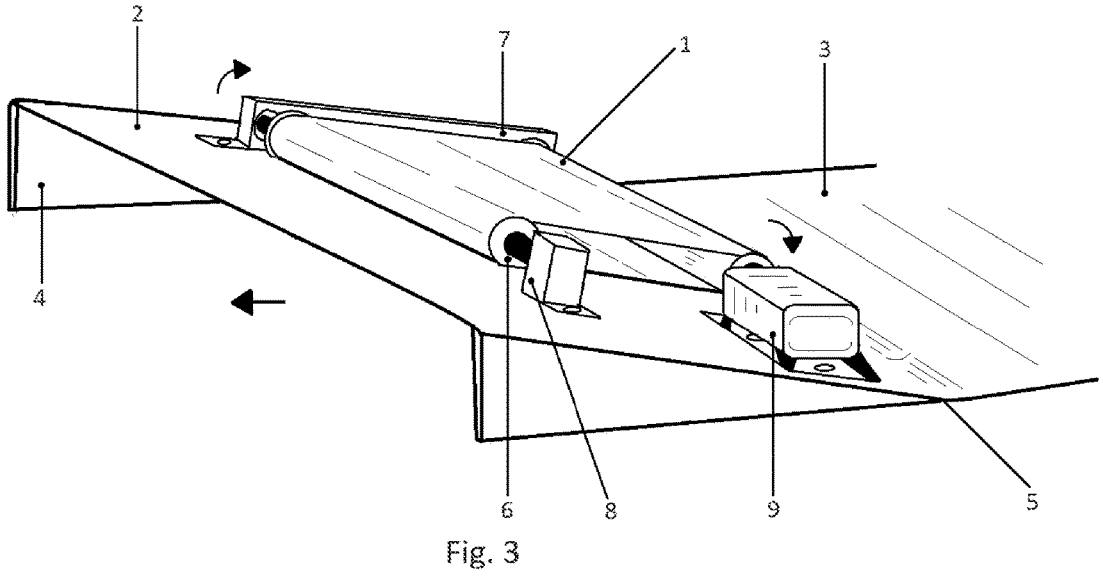
FIG. 3 is an isometric view schematic of the rolling diffuser ramp showing the underbody diffuser-floor with mounted positioning on the diffuser of the conveyor belt pulley system, axle shafts, electric motor, and the rotational direction of the belt ramp and airflow direction.

The schematic in FIG. 3 provides a detailed illustration of the functional setup of the diffuser ramp setup. As airflow travels under the vehicle floor 3 and along the radiused diffuser inlet or kick point 5, the rotational direction (shown with clockwise rotation arrows) of the rolling diffuser ramp pulley belt 1 looped around cylindrical shafts 6 which extend into a pair of bearing blocks on one side 7 and a singular bearing block on the other side 8, accelerates flow through the diffuser expansion to the diffuser exit (leftwards horizontal arrow). The rotational speed of the rolling ramp pulley belt is provided and controlled by the electric motor 9 mounted on one side of the stationary diffuser ramp area near the diffuser inlet. The exit of the upswept diffuser area is confined by the stationary part of the differ ramp 2 and an end plate 4 on both longitudinal sides of the diffuser.

Figure 4:
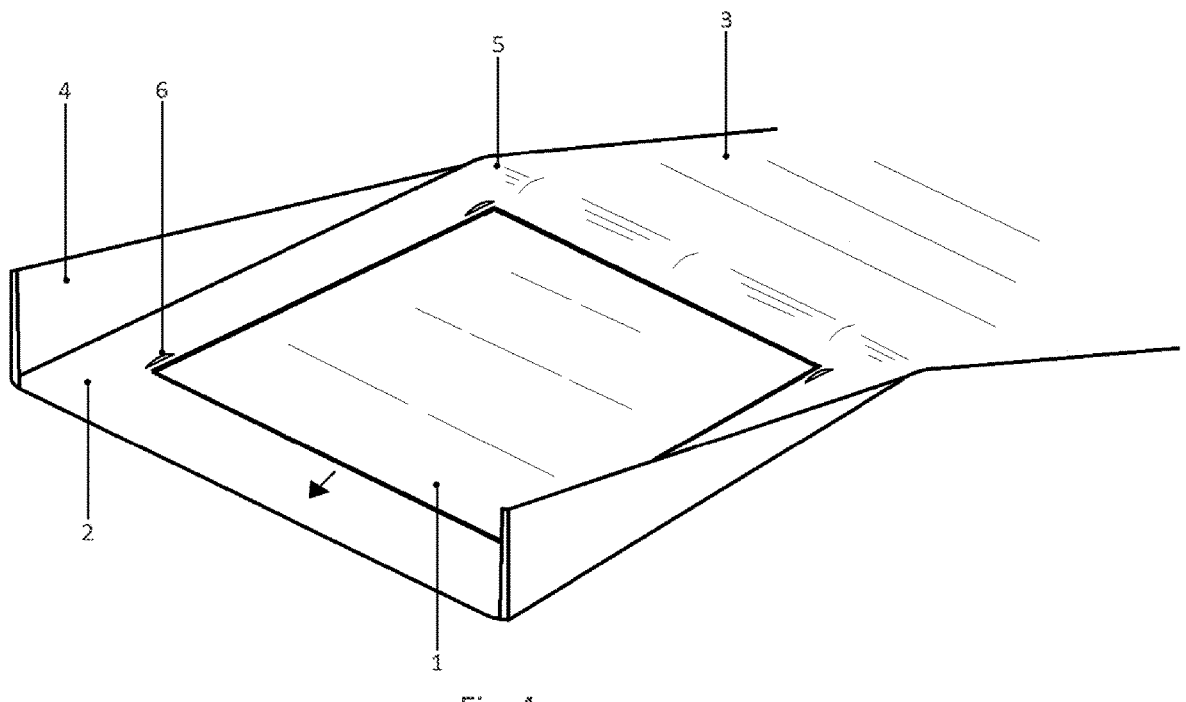
FIG. 4 is an inverted isometric view illustration of the underbody diffuser-floor with the rolling diffuser ramp and its direction of motion.

The inverted illustration in FIG. 4 further expands on the underbody view of the vehicle including the rolling diffuser ramp surface exposed to the underbody flow. The diffuser inlet or kick point 5, induces a localized maximum pressure drop as the upstream underbody airflow from the underfloor 3 speeds into the diffuser expansion. Downforce generated by the diffuser is further increased with the rolling ramp 1 moving in the freestream direction (shown with an arrow). The rolling action of the ramp accelerates the diffuser airflow which in-turn increases inlet suction and extends suction further downstream to the stationary part of the diffuser ramp 2 towards the diffuser exit. This gradually delays the pressure drop recovery from the diffuser inlet to exit and strengthens vorticity of the longitudinal vortex along each diffuser end plate 4 on both ends of the diffuser length, thus enhancing downforce. The electric motor and its speed control switch control the rolling diffuser ramp speed by enabling operability in two modes: a zero-velocity stationary mode and a rolling mode between 15 m/s to 50 m/s so as to always activate the rolling diffuser ramp functionality in enhancing downforce when switched on.

The invention claimed is:

1. A rolling diffuser ramp for motor vehicle, comprising of a flat conveyor belt looped in tension around a driver and a driven pulley of equal size forming a moveable part of the rolling diffuser ramp, two cylindrical axle shafts that attach each of the driver and driven pulleys to bearing blocks on both sides, an electric motor mounted on one side of a stationary part of the rolling diffuser ramp near a kick point with its drive shaft connected to the driver pulley, wherein under rotational drive motion of the electric motor, the flat conveyor belt is rotated by the driver and driven pulleys, thereby underneath the rolling diffuser ramp, the rolling diffuser ramp moves in the direction of diffuser inlet to exit.

2. A rolling diffuser ramp for motor vehicle as described in claim 1, wherein the rolling diffuser ramp with thickness of about 1 mm to 2 mm, rectangular in shape and centrally positioned forms 70% to 80% of the overall rolling diffuser ramp.

3. A rolling diffuser ramp for motor vehicle as described in claim 1, wherein the rolling diffuser ramp hangs above the stationary portion of the rolling diffuser ramp within a 5 mm clearance.

4. A rolling diffuser ramp for motor vehicle as described in claim 1, wherein the rolling diffuser ramp is looped around two parallel conveyor pulleys—the driver pulley near the diffuser inlet or kick point and the driven pulley downstream near the diffuser exit.

5. A rolling diffuser ramp for motor vehicle as described in claim 1, wherein the driver pulley attached to an axle shaft as rotational axis is connected at one end to the electric motor and the other end is connected to a bearing block.

6. A rolling diffuser ramp for motor vehicle as described in claim 1, wherein the driven pulley attached to an axle shaft as rotational axis where one end—on a side of the electric motor—is connected to a bearing block, and the other end connected to a bearing block attached together with a bearing block of the driver pulley.

7. A rolling diffuser ramp for motor vehicle as described in claim 1, wherein the electric motor drives the rotation of the rolling diffuser ramp in the direction as seen from underneath the diffuser from diffuser kick point to its exit or from exit to kick point direction as seen from above so as to always activate the rolling diffuser ramp functionality in enhancing downforce.

8. A rolling diffuser ramp for motor vehicle as described in claim 1, wherein the electric motor and its speed control switch controls the rolling diffuser ramp speed by enabling operability in two modes: a zero-velocity stationary mode and a rolling mode between 15 m/s to 50 m/s so as to always activate the rolling diffuser ramp functionality in enhancing downforce when switched on.

\* \* \* \* \*